United States Patent Office 3,484,372
Patented Dec. 16, 1969

3,484,372
FIRE-EXTINGUISHING COMPOSITIONS
James Derek Birchall, Northwich, England, assignor to Imperial Chemical Industries Limited, London, England, a corporation of Great Britain
No Drawing. Filed Aug. 1, 1966, Ser. No. 569,046
Claims priority, application Great Britain, Aug. 11, 1965, 34,374/65
Int. Cl. A62d 1/00
U.S. Cl. 252—7         10 Claims

ABSTRACT OF THE DISCLOSURE

Novel fire-extinguishing compositions are made by mixing at least one of bicarbonates and carbonates and hydroxides of sodium and potassium, ammonium sulphate, bisulphate, chloride, bromide and ammonium hydrogen phosphate with molten urea at about 130°–150° C., allowing the melt to solidify and grinding to a fine powder. The proportion of the added salt is from 10% to 70% by weight of the melt and the preferred salt is potassium bicarbonate.

---

This invention relates to compositions of matter having the ability to extinguish flames arising from the combustion of liquid and gaseous fuels such as liquid hydrocarbons, hydrogen, methane and of solid fuels such as wood, paper and textiles.

Water is suitable for putting out fires of burning wood, paper and textiles but is unsuitable and even dangerous for use against burning hydrocarbons and fires in electrical equipment for example transformers. For putting out fires of burning hydrocarbons several agents are available, for example carbon dioxide, bromochlorodifluoromethane and various powders comprising essentially sodium bicarbonate or potassium bicarbonate. Mixtures based on other particulate chemicals are known, for example mixtures containing ammonium phosphate or ammonium sulphate together sometimes with a thermoplastic material intended to assist in extinguishing the fire by forming an impermeable skin on the burning object. Mixtures of this type are sometimes described as all-purpose extinguishing agents but they have in general low efficiency against liquid-fuel or gaseous-fuel fires.

The efficiency of sodium and potassium bicarbonates and hydroxides, and of other sodium and potassium salts in extinguishing liquid-fuel and gaseous-fuel fires depends on their specific surface-area, the efficiency being greater the finer the particle-size and hence the greater the surface-area. In general potassium, rubidium and caesium compounds are regarded as superior to sodium compounds but the efficiency also depends on the acid radical of the salt. For example in the extinction of diffusion flames potassium oxalate is twenty to thirty times more effective than potassium bicarbonate though both in the flame yield potassium carbonate. From the results of my experiments I believe this difference is due to the smaller particle-size of the potassium carbonate produced from potassium oxalate. We find that the particle-size of potassium carbonate produced from potassium bicarbonate differs little from that of the latter whereas the particle-size of that produced by heating potassium oxalate is in the submicron range. Since the species active in inhibiting flame is considered to be either the ion of the alkali metal or a derivative thereof it is reasonable to believe that smaller particles by yielding a higher concentration of active species than do large particles would be more effective. The inherent volatility of the particles produced in the flame is also important.

Thus an efficient material for extinguishing flames from burning liquid or gaseous fuels should be able to release quickly in the flame very small particles of alkali metal compounds that readily give rise to active species. It should preferably not be poisonous as are alkali metal oxalates, and to have practical utility it should not be expensive. It is one object of this invention to provide such materials and we have found it can be achieved by mixing the active substance for example the alkali metal compound with molten urea and allowing the resulting mass to cool and solidify.

Examples of alkali metal compounds that can be used in this way are carbonates, bicarbonates, hydroxides and lower fatty acid salts of sodium and potassium, of which potassium bicarbonate is particularly effective.

We find further that such compositions of alkali metal compounds and urea are also effective in extinguishing burning cellulosic materials such as wood, paper and cotton. Under these circumstances the urea too contributes to the fire-extinguishing effect by liberating non-combustible gases and by melting to form a coating on the burning object that interferes with combustion.

Other substances that when compounded with urea gain in effectiveness against burning cellulosic materials are ammonium salts of strong acids, for example ammonium chloride, bromide, sulphate, bisulphate and diammonium hydrogen phosphate. Urea compositions of these ammonium salts are strongly acidic when hot and this enhances the known action of the salts against burning cellulosic materials which is usually regarded as being due to the effect of their residual acidity in dehydrating cellulose and altering the composition of its pyrolysis products in the direction of reducing the concentration of flammable volatile compounds therein.

Thus according to one form of my invention I provide a material for use in extinguishing fires comprising a composition as hereinafter defined of urea and at least one active fire-extinguishing agent selected from salts and hydroxides of alkali metals.

In one particular form of the invention a material for use in extinguishing fires comprises a composition of urea and at least one salt chosen from bicarbonates and carbonates of sodium and potassium.

In another form of the invention a material for use in extinguishing fires comprises a composition of urea and at least one salt chosen from ammonium sulphate, bisulphate, chloride, bromide and hydrogen phosphate.

The composition of urea and fire-extinguishing agent is defined as the material obtained by mixing the agent or agents with molten urea and subsequently allowing the melt to cool and solidify. The operation is conveniently carried out under a moderate pressure of about 5 atmospheres and at a temperature of 130–150° C. when alkali metal and ammonium salts are the active fire-extinguishing agents. When alkali metal hydroxides are the chosen agents the operation can be carried out at atmospheric pressure. For use as a powdered fire-extinguishing material the solid mass so obtained is finely ground, for example to give a powder passing a No. 240 British Standard mesh. Anti-caking agents and free-flowing agents may be added to the powder, for example stearic acid, stearates, talc and finely divided alkaline earth silicates; other materials can be added for specific purposes where necessary. The unground solid mass may also be used as a fire-extinguishing material, for example as a lining or coating for materials of construction liable to be exposed to flames or high temperatures.

The compositions conveniently contain from 10% to 70% by weight of active fire-extinguishing agents.

The invention is illustrated by experiments carried out in an apparatus designed to test the ability of powders to extinguish a flame of burning combustible gas for example hydrogen or coal gas. The apparatus comprises a vertical tube 1 metre high and 5.5 cms. internal diameter fitted with a baffle 35 cms. from its lower end arranged to disperse falling powder. The gas issues from a horizontal jet having its orifice just below the lower end of the tube and on the vertical axis thereof so that powder falling down the tube can impinge on the flame. The flame and lower end of the tube are surrounded by a guard-collar 11 cms. diameter and 20 cms. high. A small bucket is arranged at the upper end of the tube to tip its contents down the tube, and air is also passed down the tube to counteract convection caused by the flame.

With a flame of burning hydrogen at a feed-rate to the jet of 1.2 litres per minute the effects of various powders of particle size less than 64 microns placed in the bucket and allowed to fall down the tube were observed and are summarised in Table 1.

TABLE 1

| Powder | Weight in g. allowed to fall |
|---|---|
| Sodium bicarbonate | No extinction below 11 g. |
| Potassium ferrocyanide | No extinction below 7 g. |
| Potassium oxalate | No extinction below 11 g. |
| Urea/potassium bicarbonate | Flame extinguished with 5 g. |

Each of the four substances included in Table 1 was prepared in powder form by grinding it through a No. 240 British Standard mesh together with 1% by weight magnesium stearate and 0.5% by weight talc to give free-flowing properties. The urea/potassium bicarbonate compoistion was made by heating 70 parts by weight of urea with 30 parts by weight of potassium bicarbonate in an autoclave for 2 hours at 140° C. under a maximum pressure of 325 lb./sq. inch.

A similar set of experiments was carried out, using a flame of burning coal gas with a feed-rate to the jet of 1.2 litres per minute, to test the effect of the particle-size of the powders. The results are summarised in Table 2. No additions were made to give free-flowing properties to the powders; the urea/potassium bicarbonate ratio, namely 70% urea, 30% potassium bicarbonate by weight, was the same as that of the material used in the experiments summarised in Table 1.

TABLE 2

| Powder | Weight in g. allowed to fall of particle-size | | | |
|---|---|---|---|---|
| | 128μ | 90μ | 70μ | 30μ |
| Sodium bicarbonate | | | 9 | 6 | 3 |
| Potassium ferrocyanide | 2.2 | 0.3 | 0.1 | |
| Potassium oxalate | 2.8 | 0.1 | 0.1 | |
| Urea/potassium bicarbonate | 2.0 | 1.2 | 0.5 | |

The invention is further illustrated by experiments in which a powder having a particle size of approximately 80 microns was spread over the surface of a sheet of filter paper mounted horizontally and the paper and powder then exposed to a temperature of 850° C. Paper alone burst into flames immediately at this temperature. The results are shown in Table 3. The term powder/urea refers to a composition of 75 parts by weight of urea and 25 parts by weight of the inorganic salt.

TABLE 3

| Powder | Amount required to prevent flame, g./cm.² | |
|---|---|---|
| | Powder alone | Powder/urea |
| Ammonium chloride | 5.0 | 1.5 |
| Ammonium bromide | 2.5 | 0.5 |
| Ammonium sulphate | 6.3 | 2.0 |
| Diammonium phosphate | 3.3 | 1.7 |
| Potassium sulphate | 2.8 | 2.0 |

What I claim is:
1. A solid, chemical fire extinguishing composition consisting essentially of the product obtained by mixing with molten urea at least one member selected from the group consisting of potassium and sodium bicarbonates, carbonates and hydroxides and the sulphate, bisulphate, chloride, bromide and hydrogen phosphate ammonium salts, the proportion of said member in the melt being from 10% to 70% by weight thereof, and subsequently cooling and solidifying and powdering the melt.
2. A composition as claimed in claim 1 wherein the said member is at least one salt selected from the group consisting of bicarbonates and carbonates of sodium and of potassium.
3. A composition as claimed in claim 1 wherein the said member is at least one hydroxide selected from the group consisting of sodium hydroxide and potassium hydroxide.
4. A composition according to claim 1 wherein the said member is at least one salt selected from the group consisting of ammonium sulphate, ammonium bisulphate, ammonium chloride, ammonium bromide and diammonium hydrogen phosphate.
5. A composition as claimed in claim 2 wherein the said member is potassium bicarbonate.
6. A method of protecting materials of construction from the action of fire comprising coating or lining said materials with a composition consisting essentially of the product obtained by adding to molten urea at least one member selected from the group consisting of carbonates, bicarbonates and hydroxides of sodium and of potassium, the proportion of said member in the melt being from 10% to 70% by weight thereof.
7. A method as claimed in claim 6 wherein the said member is potassium bicarbonate.
8. A method of protecting materials of construction from the action of fire comprising coating or lining said materials with a composition consisting essentially of the product obtained by adding to molten urea at least one salt selected from the group consisting of ammonium sulphate, ammonium bisulphate, ammonium chloride, ammonium bromide and diammonium hydrogen phosphate, the proportion of said salt in the melt being from 10% to 70% by weight thereof.
9. Materials of construction coated or lined with a composition consisting essentially of the product obtained by adding to molten urea at least one member selected from the group consisting of carbonates, bicarbonates and hydroxides of sodium and potassium, the proportion of said salt in the melt being from 10% to 70% by weight thereof.
10. Materials of construction coated or lined with a composition consisting essentially of the product obtained by adding to molten urea at least one salt selected from the group consisting of ammonium sulphate, ammonium bisulphate, ammonium chloride, ammonium bromide and diammonium hydrogen phosphate, the proportion of said salt in the melt being from 10% to 70% by weight thereof.

References Cited

UNITED STATES PATENTS

| 1,895,692 | 1/1933 | Thomas et al. | 252—7 |
| 2,935,471 | 5/1960 | Aarons et al. | 252—84 |
| 3,017,348 | 1/1962 | Steppe et al. | 252—2 |

FOREIGN PATENTS

| 838,638 | 3/1939 | France. |
| 1,130,705 | 5/1962 | Germany. |

MAYER WEINBLATT, Primary Examiner

U.S. Cl. X.R.

117—137; 106—15; 252—2